(12) United States Patent
Jones

(10) Patent No.: US 9,522,717 B2
(45) Date of Patent: Dec. 20, 2016

(54) EMERGENCY SIGNALING DEVICE

(71) Applicant: Lim Jones, Catonsville, MD (US)

(72) Inventor: Lim Jones, Catonsville, MD (US)

( * ) Notice: Subject to any disclaimer, the term of this patent is extended or adjusted under 35 U.S.C. 154(b) by 0 days.

(21) Appl. No.: 14/687,187

(22) Filed: Apr. 15, 2015

(65) Prior Publication Data

US 2016/0304178 A1    Oct. 20, 2016

(51) Int. Cl.
*B63C 9/08* (2006.01)
*B63C 9/20* (2006.01)
*B64B 1/50* (2006.01)
*B63C 9/11* (2006.01)

(52) U.S. Cl.
CPC . *B63C 9/20* (2013.01); *B63C 9/11* (2013.01); *B64B 1/50* (2013.01)

(58) Field of Classification Search
CPC ............ B63C 9/00; B63C 9/0005; B63C 9/11; B63C 9/18; B63C 9/20; B63C 2009/00; B63C 2009/0023; B64B 1/50
USPC .................... 441/80, 88, 89, 90, 92, 106–119
See application file for complete search history.

(56) References Cited

U.S. PATENT DOCUMENTS

| | | | |
|---|---|---|---|
| 4,768,739 A | 9/1988 | Schnee | |
| 4,815,677 A * | 3/1989 | Rushing | G08B 5/002 116/210 |
| 5,030,152 A * | 7/1991 | Carr | B63C 9/20 340/604 |
| 5,326,297 A | 7/1994 | Loughlin | |
| 5,736,954 A | 4/1998 | Veazey | |
| 6,195,039 B1 | 2/2001 | Glass, Jr. | |
| 6,203,390 B1 * | 3/2001 | Elliott | B63C 9/115 441/80 |
| 6,222,484 B1 * | 4/2001 | Seiple | B63C 9/0005 342/357.55 |
| 6,332,424 B1 | 12/2001 | Frink | |
| 7,104,858 B1 * | 9/2006 | Yonover | B63C 9/20 441/106 |
| 8,356,569 B2 | 1/2013 | Sjoblom | |

OTHER PUBLICATIONS

Title: www.overtons.com Product Name: McMurdo Fastfind Plus PLB with Built-In GPS.

* cited by examiner

*Primary Examiner* — Daniel V Venne

(57) ABSTRACT

An emergency signaling device allows a user to signal for help in an emergency.
The device includes a lifejacket configured for being worn by a user to promote buoyancy in water. A tether is coupled to the lifejacket. The tether has a distal end with respect to the lifejacket. A balloon is coupled to the distal end of the tether. A gas storage tank is coupled to the lifejacket. The gas storage tank contains compressed lighter-than-air gas. The gas storage device is fluidly coupled to the balloon for injecting the balloon with the gas. The balloon extends above the lifejacket when the balloon is inflated with the gas to indicate a location of the lifejacket.

14 Claims, 5 Drawing Sheets

EMERGENCY SIGNALING DEVICE

BACKGROUND OF THE DISCLOSURE

Field of the Disclosure

The disclosure relates to location signaling devices and more particularly pertains to a new location signaling device for allowing a user to signal for help in an emergency.

SUMMARY OF THE DISCLOSURE

An embodiment of the disclosure meets the needs presented above by generally comprising a lifejacket configured for being worn by a user to promote buoyancy in water. A tether is coupled to the lifejacket. The tether has a distal end with respect to the lifejacket. A balloon is coupled to the distal end of the tether. A gas storage tank is coupled to the lifejacket. The gas storage tank contains compressed lighter-than-air gas. The gas storage device is fluidly coupled to the balloon for injecting the balloon with the gas. The balloon extends above the lifejacket when the balloon is inflated with the gas to indicate a location of the lifejacket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
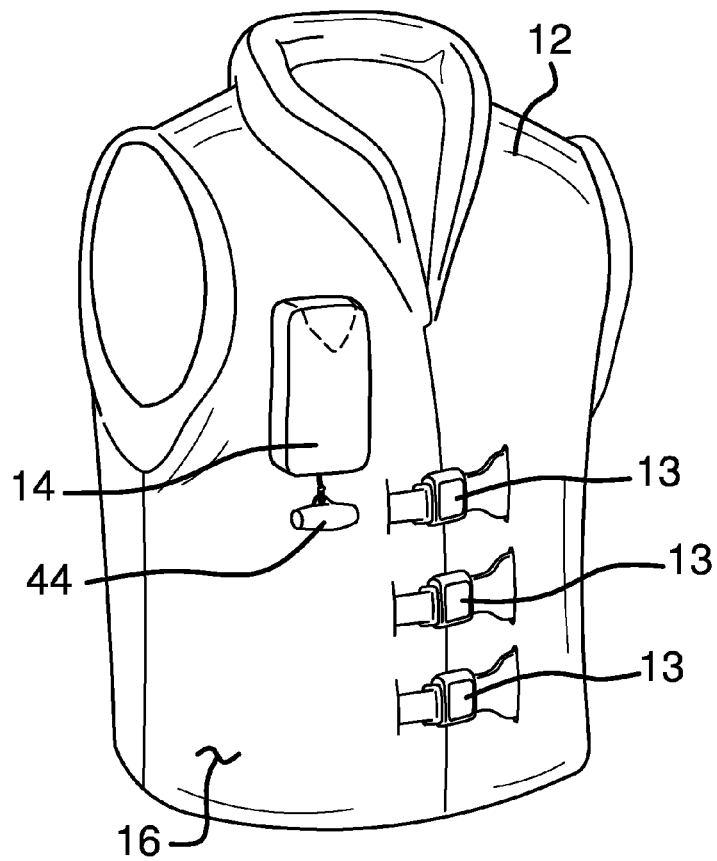
FIG. 1 is a top front side perspective view of a lifejacket of an emergency signaling device according to an embodiment of the disclosure.
Figure 2:
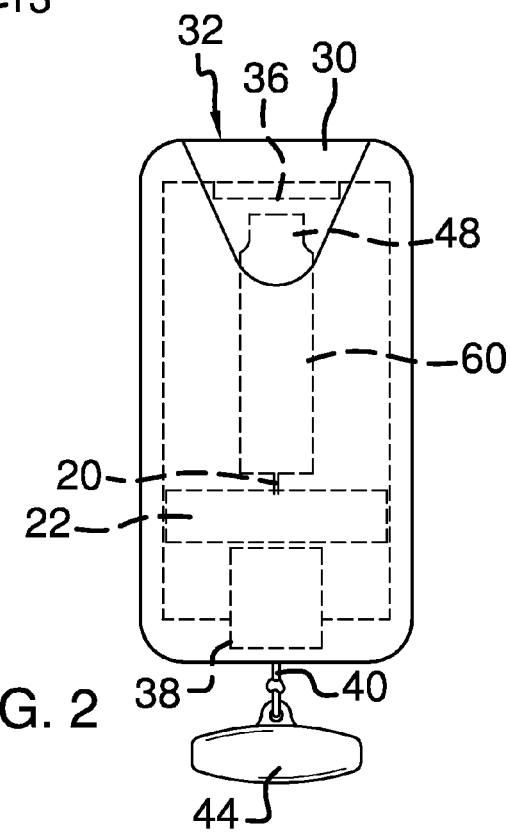
FIG. 2 is a detailed view of a compartment of an embodiment of the disclosure.
Figure 3:
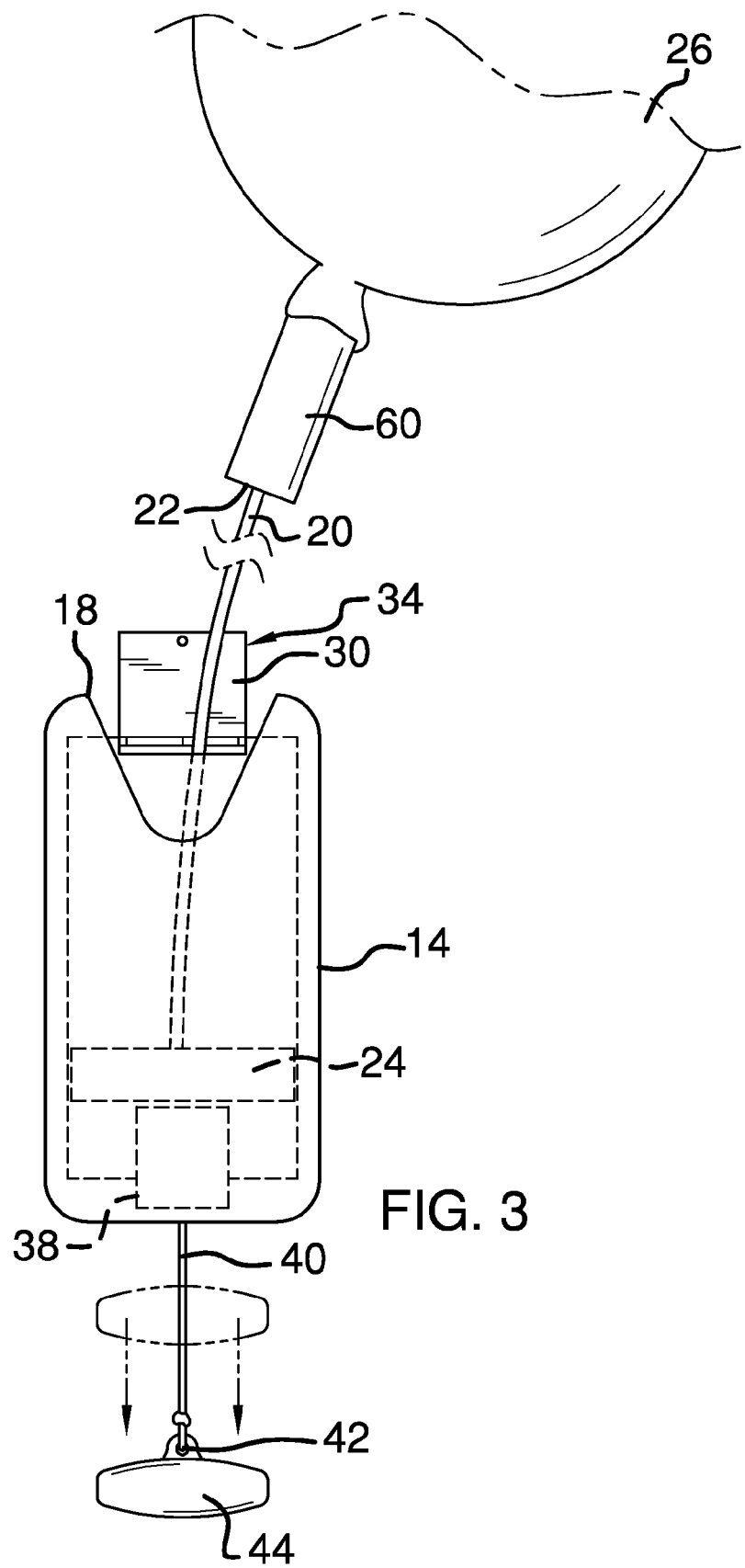
FIG. 3 is a detailed view of an embodiment of the disclosure showing the balloon extending outwardly of the compartment.
Figure 4:
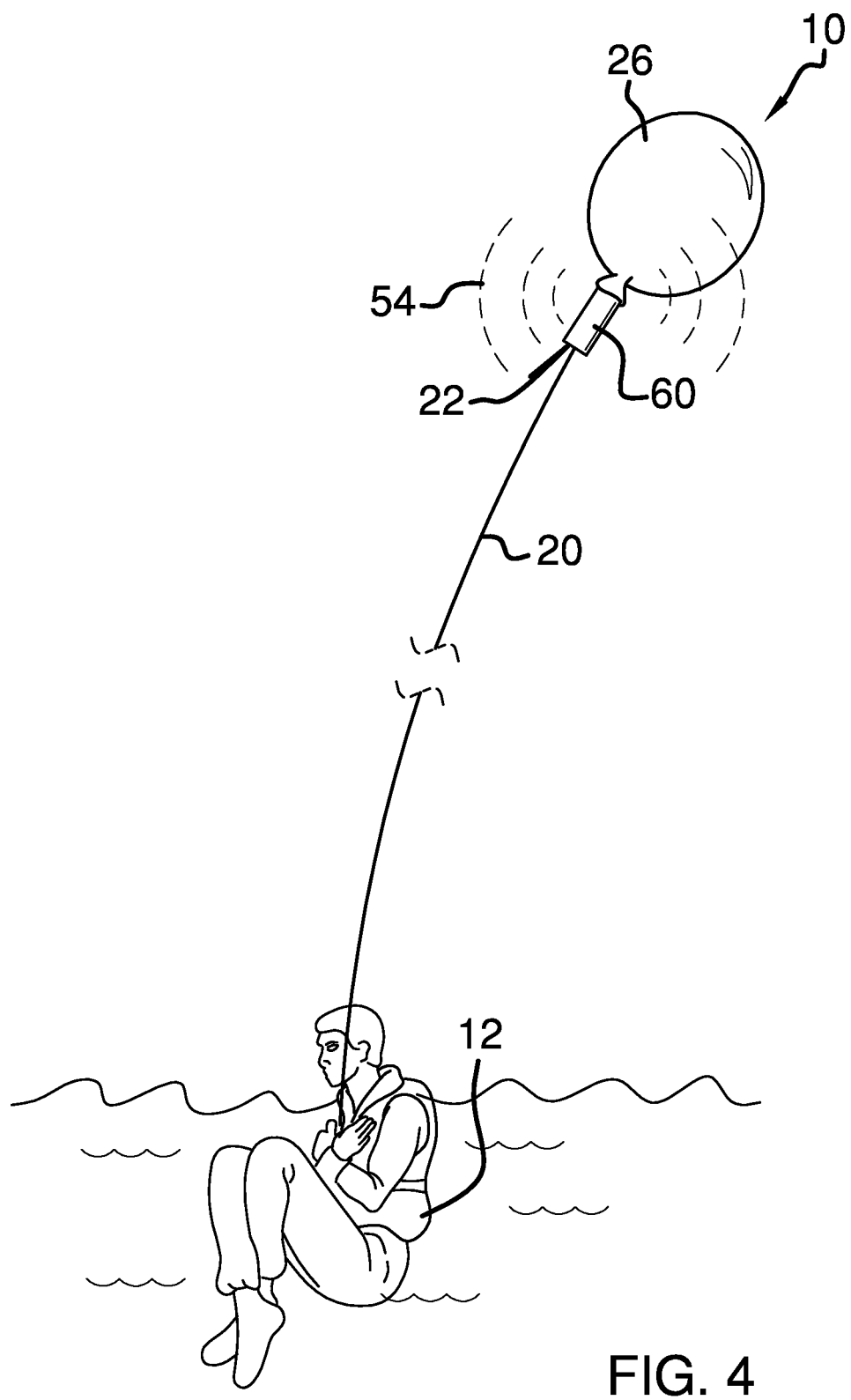
FIG. 4 is an in-use view of an embodiment of the disclosure.
Figure 5:
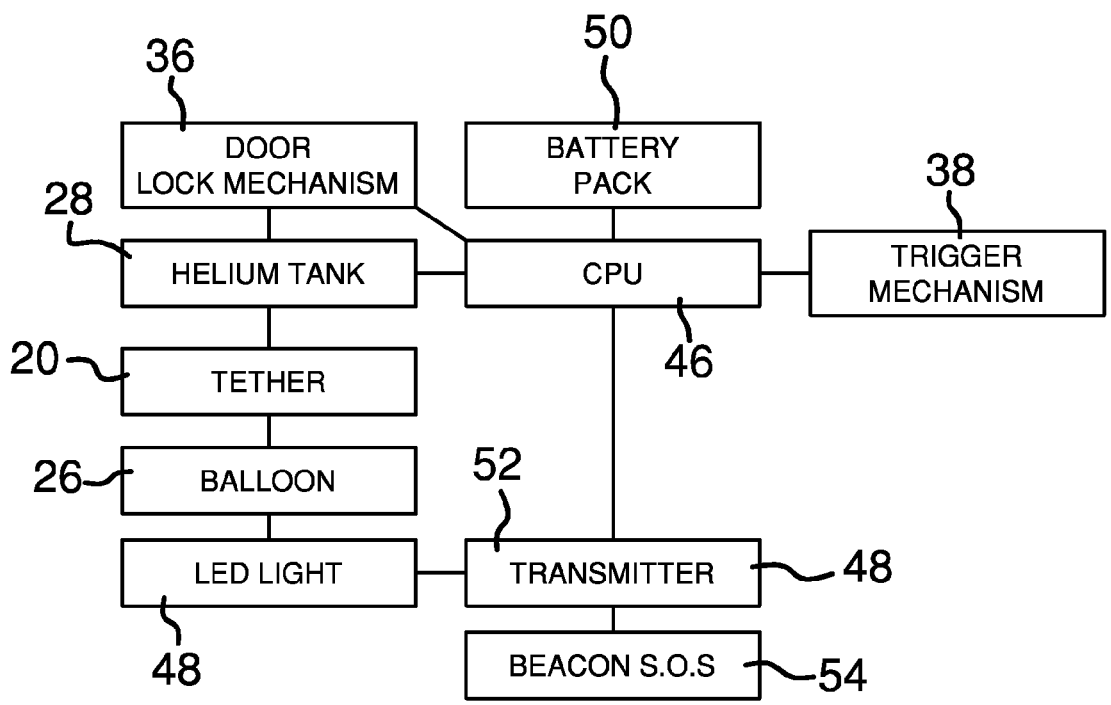
FIG. 5 is a schematic diagram of an embodiment of the disclosure.

With reference now to the drawings, and in particular to FIGS. 1 through 6 thereof, a new location signaling device embodying the principles and concepts of an embodiment of the disclosure and generally designated by the reference numeral 10 will be described.

As best illustrated in FIGS. 1 through 6, the emergency signaling device 10 generally comprises a lifejacket 12 configured for being worn by a user to promote buoyancy in water. The lifejacket 12 is generally conventional and may include buckles 13 or similar fasteners. A compartment 14 is coupled to the lifejacket 12. The compartment 14 may be positioned on a front side 16 of the lifejacket 12 to facilitate ease of access to the compartment 12. The compartment 14 has an open top end 18.

A tether 20 is coupled to the lifejacket 12 and is positionable within the compartment 14. The tether 20 has a distal end 22 with respect to the lifejacket 12. The tether 20 may have a length between approximately 1375.0 cm and 3050.0 cm. A spool 24 is coupled to the compartment 14. The spool 24 is positioned within the compartment 14. The tether 20 is rotatably mounted around the spool 24 to hold the tether 20 in a coiled manner on the spool 24. A balloon 26 is coupled to the distal end 22 of the tether 20. The balloon 26 is positionable within the compartment 14 when the balloon 26 is deflated. A gas storage tank 28 contains compressed lighter-than-air gas, such as helium or the like. The gas storage tank 28 is fluidly coupled to the balloon 26 for injecting the balloon 26 with the gas. The balloon 26 extends above the lifejacket 12 when the balloon 26 is inflated with the gas to indicate a location of the lifejacket 12. The gas storage tank 28 is positioned within the compartment 14.

A door 30 is coupled to the compartment 14. The door 30 covers the open top end 18 of the compartment 14 when the door 30 is in a closed position 32. The door 30 exposes the open top end 18 of the compartment 14 when the door 30 is in an opened position 34. A locking mechanism 36 is coupled to the door 30. The locking mechanism 36 selectively secures the door 30 in the closed position 32.

A trigger 38 is operationally coupled to the locking mechanism 36 in a conventional manner wherein activation of the trigger 38 disengages the locking mechanism 36. The trigger 38 is positioned in the compartment 14. A cord 40 is coupled to the trigger 38. A distal end 42 of the cord 40 extends outwardly of the compartment 14. The cord 40 is mechanically coupled to the trigger 38 wherein pulling the cord 40 outwardly of the compartment 14 activates the trigger 38. A handle 44 is coupled to the distal end 42 of the cord 40 to facilitate pulling the cord 40 outwardly of the compartment 14.

A processor 46 is mounted in the balloon 26. A light 48 is coupled to the balloon 26. The processor 46 is electrically coupled to the light 48. The light 48 may blink intermittently when actuated to draw increased attention to the device 10. A global positioning system 56 is mounted to the balloon 26. The global positioning system 56 is electrically coupled to the processor 46 wherein the global positioning system 56 is configured to provide location data to the processor 46 upon activation of the trigger 38. A power source 50 is coupled to the balloon 26 as described below. The power source 50 is electrically coupled to the processor 46 for providing power to the processor 46. The power source 50 may comprise at least one battery 72. A transmitter 52 is coupled to the balloon 26. The transmitter 52 is communicatively coupled to the processor 46 wherein the processor 46 causes the transmitter 52 to transmit an emergency signal 54 to an external receiver upon activation of the trigger 38.

Figure 6:
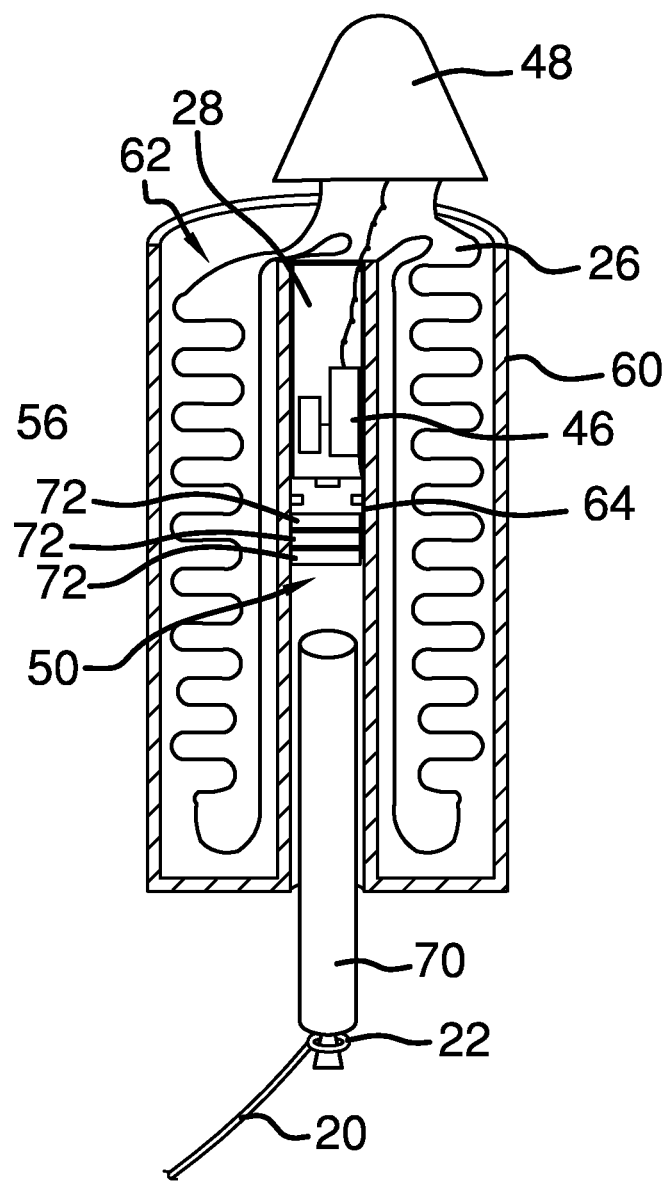
FIG. 6 is a cross-sectional view of a housing holding a balloon of the present invention in a collapsed state.

As shown in FIG. 6, a housing 60 defines an interior space 62. The housing 60 is positioned in the compartment 14. An interior wall 64 is positioned within the interior space 64 defining a central core 66 within the housing 60. The balloon 26 is positionable in a collapsed position between the housing 60 and the interior wall 64 such that the balloon 26 extends around the central core 66. The balloon 26 has an open end 68 coupled to the interior wall 64. The gas storage tank 28 is positioned within the central core 66 adjacent to the open end 68 of the balloon 26. A pin 70 is coupled to the housing 60. The pin 70 is aligned with the central core 66. The power source 50 may be a plurality of batteries 72 positioned within the central core 66 in spaced relationship to the gas storage tank 28. The batteries 72 are urged into contact with the gas storage tank 28 upon sliding of the pin 70 into the central core 66. Thus, the batteries 72 contact and activate the gas storage tank 28 injecting the gas into the balloon 26.

In use, as stated above and shown in the Figures, the lifejacket 12 is worn by the user. During an emergency, the user pulls the cord 40 outwardly of the compartment 14, causing the trigger 38 to disengage the locking mechanism 36 and exposing the housing 60. The pin 70 is driven into the housing 60 to activate the gas storage tank 28 inflating the balloon 26 with air from the gas storage tank 28. The tether 20 suspends the balloon 26 above the lifejacket 12 to alert others to the emergency situation and the location of the user. The global positioning system 48 tracks the geographical coordinates of the device 10 and the transmitter 52 transmits an emergency signal to an external receiver that includes the geographical coordinates. In this manner, the device 10 facilitates location and rescue of a user during an emergency situation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An emergency signaling device comprising:
   a lifejacket configured for being worn by a user to promote buoyancy in water;
   a tether coupled to said lifejacket, said tether having a distal end with respect to said lifejacket;
   a balloon coupled to said distal end of said tether;
   a gas storage tank coupled to said lifejacket, said gas storage tank containing compressed lighter-than-air gas, said gas storage tank being fluidly coupled to said balloon for injecting said balloon with the gas, said balloon extending above said lifejacket when said balloon is inflated with the gas to indicate a location of said lifejacket;
   a housing defining in interior space;
   an interior wall positioned within said interior space defining a central core within said housing, said balloon being positionable in a collapsed position between said housing and said interior wall such that said balloon extends around said central core, said balloon having an open end coupled to said interior wall;
   said gas storage tank being positioned within said central core adjacent to said open end of said balloon;
   a pin coupled to said housing, said pin being aligned with said central core;
   said power source being a plurality of batteries positioned within said central core in spaced relationship to said gas storage tank, said batteries being urged into contact with said gas storage tank upon sliding of said pin into said central core whereby said batteries contact and activate said gas storage tank injecting the gas into said balloon.

2. The device of claim 1, further comprising:
   a compartment coupled to said lifejacket;
   said tether being positionable within said compartment;
   said balloon being positionable within said compartment when said balloon is deflated; and
   said gas storage tank being positioned within said compartment.

3. The device of claim 2, further comprising a spool being coupled to said compartment, said spool being positioned within said compartment, said tether being rotatably mounted around said spool to hold said tether in a coiled manner on said spool.

4. The device of claim 2, further comprising:
   said compartment having an open top end; and
   a door coupled to said compartment, said door covering said open top end of said compartment when said door is in a closed position, said door exposing said open top end of said compartment when said door is in an opened position.

5. The device of claim 4, further comprising a locking mechanism coupled to said door, said locking mechanism selectively securing said door in the closed position.

6. The device of claim 1, further comprising:
   a processor coupled to said balloon; and
   a light coupled to said balloon for illuminating said balloon, said processor being electrically coupled to said light.

7. The device of claim 6, further comprising a global positioning system coupled to said balloon, said global positioning system being electrically coupled to said processor wherein said global positioning system is configured to provide location data to said processor upon activation of said trigger.

8. The device of claim 6, further comprising a power source coupled to said balloon, said power source being electrically coupled to said processor for providing power to said processor.

9. The device of claim 8, further comprising said power source comprising at least one battery.

10. The device of claim 6, wherein said light blinks intermittently when actuated.

11. An emergency signaling device comprising:
    a lifejacket configured for being worn by a user to promote buoyancy in water;
    a tether coupled to said lifejacket, said tether having a distal end with respect to said lifejacket;
    a balloon coupled to said distal end of said tether;
    a gas storage tank coupled to said lifejacket, said gas storage tank containing compressed lighter-than-air gas, said gas storage tank being fluidly coupled to said balloon for injecting said balloon with the gas, said balloon extending above said lifejacket when said balloon is inflated with the gas to indicate a location of said lifejacket;

a compartment coupled to said lifejacket, said tether being positionable within said compartment, said balloon being positionable within said compartment when said balloon is deflated, said gas storage tank being positioned within said compartment, said compartment having an open top end;

a door coupled to said compartment, said door covering said open top end of said compartment when said door is in a closed position, said door exposing said open top end of said compartment when said door is in an opened position;

a locking mechanism coupled to said door, said locking mechanism selectively securing said door in the closed position; and a trigger being operationally coupled to said locking mechanism wherein activation of said trigger disengages said locking mechanism.

12. The device of claim 11, further comprising a cord coupled to said trigger, a distal end of said cord extending outwardly of said compartment, said cord being mechanically coupled to said trigger wherein pulling said cord outwardly of said compartment activates said trigger.

13. The device of claim 12, further comprising a handle coupled to said distal end of said cord to facilitate pulling said cord outwardly of said compartment.

14. An emergency signaling device comprising:
- a lifejacket configured for being worn by a user to promote buoyancy in water;
- a compartment coupled to said lifejacket, said compartment being positioned on a front side of said lifejacket, said compartment having an open top end;
- a tether coupled to said lifejacket and being positionable within said compartment, said tether having a distal end with respect to said lifejacket;
- a spool being coupled to said compartment, said spool being positioned within said compartment, said tether being rotatably mounted around said spool to hold said tether in a coiled manner on said spool;
- a balloon coupled to said distal end of said tether, said balloon being positionable within said compartment when said balloon is deflated;
- a gas storage tank containing compressed lighter-than-air gas, said gas storage tank being fluidly coupled to said balloon for injecting said balloon with the gas, said balloon extending above said lifejacket when said balloon is inflated with the gas to indicate a location of said lifejacket, said gas storage tank being positioned within said compartment;
- a light coupled to said balloon for illuminating said balloon, said light blinking intermittently when actuated;
- a door coupled to said compartment, said door covering said open top end of said compartment when said door is in a closed position, said door exposing said open top end of said compartment when said door is in an opened position;
- a locking mechanism coupled to said door, said locking mechanism selectively securing said door in the closed position;
- a trigger being operationally coupled to said locking mechanism wherein activation of said trigger disengages said locking mechanism, said trigger being positioned in said compartment;
- a cord coupled to said trigger, a distal end of said cord extending outwardly of said compartment, said cord being mechanically coupled to said trigger wherein pulling said cord outwardly of said compartment activates said trigger;
- a handle coupled to said distal end of said cord to facilitate pulling said cord outwardly of said compartment;
- a processor mounted in said balloon, said processor being electrically coupled to said light;
- a global positioning system mounted to said balloon, said global positioning system being electrically coupled to said processor wherein said global positioning system is configured to provide location data to said processor upon activation of said trigger;
- a power source mounted in said balloon, said power source being electrically coupled to said processor for providing power to said processor, said power source comprising at least one battery; and
- a transmitter coupled to said balloon, said transmitter being communicatively coupled to said processor wherein said processor causes send transmitter to transmit an emergency signal to an external receiver upon activation of said trigger;
- a housing defining in interior space;
- an interior wall positioned within said interior space defining a central core within said housing, said balloon being positionable in a collapsed position between said housing and said interior wall such that said balloon extends around said central core, said balloon having an open end coupled to said interior wall;
- said gas storage tank being positioned within said central core adjacent to said open end of said balloon;
- a pin coupled to said housing, said pin being aligned with said central core; and
- said power source being a plurality of batteries positioned within said central core in spaced relationship to said gas storage tank, said batteries being urged into contact with said gas storage tank upon sliding of said pin into said central core whereby said batteries contact and activate said gas storage tank injecting the gas into said balloon.

* * * * *